(12) United States Patent
Marczynski

(10) Patent No.: US 9,618,028 B2
(45) Date of Patent: Apr. 11, 2017

(54) ROTATION INDICATING DEVICE, PARTICULARLY FOR ALLEN BOLTS

(71) Applicant: Business Lines Limited, Cumbria (GB)

(72) Inventor: Michael Marczynski, Cumbria (GB)

(73) Assignee: BUSINESS LINES LIMITED, Carnforth, Cumbria (GB)

( * ) Notice: Subject to any disclaimer, the term of this patent is extended or adjusted under 35 U.S.C. 154(b) by 0 days.

(21) Appl. No.: 14/473,188

(22) Filed: Aug. 29, 2014

(65) Prior Publication Data

US 2015/0063940 A1  Mar. 5, 2015

(30) Foreign Application Priority Data

Aug. 30, 2013 (GB) .................................. 1315515.5

(51) Int. Cl.
*F16B 31/02* (2006.01)
*F16B 1/00* (2006.01)
*F16B 37/14* (2006.01)

(52) U.S. Cl.
CPC ............ *F16B 31/02* (2013.01); *F16B 1/0071* (2013.01); *F16B 37/14* (2013.01)

(58) Field of Classification Search
CPC ........... F16B 31/02; F16B 37/14; F16B 35/06
See application file for complete search history.

(56) References Cited

U.S. PATENT DOCUMENTS

| | | | | |
|---|---|---|---|---|
| 1,646,867 A | * | 10/1927 | Nelson | 301/35.623 |
| 3,529,508 A | * | 9/1970 | Cooksey | 411/374 |
| 4,493,597 A | | 1/1985 | Rolf | |
| 5,017,068 A | * | 5/1991 | Cooksey | 411/373 |
| 5,098,239 A | * | 3/1992 | Thiel | 411/377 |
| 5,407,310 A | * | 4/1995 | Kassouni | 411/107 |
| 6,053,681 A | | 4/2000 | Mattershead | |
| 6,158,933 A | | 12/2000 | Nicholson | |
| 6,302,630 B1 | * | 10/2001 | Grant | 411/372.6 |
| 7,744,321 B2 | * | 6/2010 | Wells | 411/377 |

FOREIGN PATENT DOCUMENTS

| | | |
|---|---|---|
| EP | 2642135 | 9/2013 |
| GB | 2325505 | 11/1998 |
| GB | 2335720 | 9/1999 |
| WO | WO 2005/021983 | 3/2005 |

\* cited by examiner

*Primary Examiner* — Flemming Saether
(74) *Attorney, Agent, or Firm* — Hamre, Schumann, Mueller & Larson, P.C.

(57) ABSTRACT

For indicating rotational displacement between an Allen bolt having a bolt head (34) provided with a central recess (36) for engagement by a fastening/unfastening tool, namely an Allen key, and a substrate to which the bolt is fastened, thereby to indicate whether the bolt has loosened, a safety indicating device is provided comprising a body (10) having a bore formed with splines (12) for engagement over the bolt head (34). The body (10) also has an end closure (14) formed with a plug (16) projecting inwardly of the bore for snug engagement into the central recess (36) of the bolt head. An indicator is also provided on the body (10). This is typically a pointer (18) mounted or formed on the body and projecting laterally, but it could be an indicator which is merely marked or formed on the body without projecting outwards. The plug (16) may itself be formed with the recess (26) which may be used for insertion of a different tool to effect rotational adjustment of the position of the device upon the bolt head (34).

13 Claims, 5 Drawing Sheets

ROTATION INDICATING DEVICE, PARTICULARLY FOR ALLEN BOLTS

This invention relates to a safety device for indicating rotational displacement between a bolt having a bolt head provided with a central recess for engagement by a fastening/unfastening tool and a substrate to which the bolt is fastened.

BACKGROUND

Safety devices are known, as disclosed in the applicant's earlier GB 2335720, for indicating relative rotational displacement between a wheel nut and a threaded stud to which it is engaged so as to indicate whether or not a wheel nut has become loose, in which case it can be tightened. The known devices comprise a body having a bore formed with equally spaced grooves enabling the device to be releasably secured to the wheel nut in any one of a plurality of positions, the grooves enabling the device to be secured to the nut by engagement of the corners or apices of the nut. The particular safety devices disclosed in above noted specification and commercially available under the name "Dustite" (registered trademark) have a closure at one end of the bore which is formed integrally with the body so as to serve as a dust cap for the wheel nut. However, as disclosed in another of the applicant's prior specifications, GB 2325505, such an end closure may be provided as a removable cap. Further, of course, these rotation indicator devices have indicating means, typically in the form of a pointer, which is either formed integrally with the body or separately and releasably connected thereto, or integrally with any removable cap, and which typically projects laterally from the body. However, such indicating means can be provided as a marker or formation (for example an arrow) on the body which does not project outwardly, and this may be useful in situations other than vehicle wheels, where there is limited space adjacent a nut or bolt head to which the device is to be applied.

Conventional nuts and bolt heads have a polygonal cross-section or perimeter, most usually hexagonal, but square is also a shape sometimes used, onto which the grooves of the known safety devices are able to releasably engage. The hexagonal or square shape also serves the primary function of enabling engagement of a fastening tool, such as a spanner or wrench. In some situations, however, alternative screw threaded fasteners are used, typically those known as Allen bolts, which have a head with a cylindrical perimeter (circular cross-section) and a central recess in the head for engagement by a fastening or unfastening tool, typically known as an Allen key. These types of fasteners may be used on flanges of pipework where it may be desirable to use a rotation indicator to show if any are working loose. The applicant's known devices are not suitable in these circumstances because the lack of corners on the Allen bolt head perimeter prevent secure, non-rotatable attachment of the known devices when fitted over said bolt heads. This is the case even when the perimeter of the Allen bolt head is formed with splines, namely a series of narrow longitudinal ridges formed by intermediate narrow grooves.

An object of the present invention is to provide a safety device, namely a rotation indicating device, comparable to known devices, but which can be used effectively on an Allen bolt.

BRIEF SUMMARY OF THE DISCLOSURE

In accordance with the present invention there is provided a safety device for indicating rotational displacement between a bolt having a bolt head provided with a central recess for engagement by a fastening/unfastening tool and a substrate to which the bolt is fastened, the device comprising a body having a bore formed with splines, having an end closure formed with a plug projecting inwardly of the bore for snug engagement into the central recess of the bolt head, and having an indicator which is marked, mounted or formed thereon.

The combination of the internal splines in the bore of the body engaging the perimeter of the bolt head and the plug engaging the central recess of the bolt head is sufficient to securely hold the device in non-rotatable manner onto the bolt head in any selected rotational position so as to rotate in unison with the bolt head and thereby indicate any loosening of the bolt. The device will, of course, be made of suitable material, for example plastics material, such as polypropylene, of which the known devices are formed, to achieve this result.

In preferred embodiments in accordance with the invention, the safety device has at least one groove, wider than any of the splines, provided in the splined surface of the bore and extending from the end closure to an edge of the body opposite to the end closure to enable escape of air during the fitting of the device onto the bolt head, specifically the required snug fitting of the plug into the central recess of the bolt head.

In some embodiments of the device of the invention the plug may be solid. In other embodiments the plug itself may be formed with a recess extending inwards from the end closure of the body. This has several advantages. It enhances the deformability of the plug to ensure its snug fitting in the recess of the bolt head. It uses less material in production of the device. Further, the recess in the plug may be configured with a polygonal cross-section, such as a hexagonal cross-section, so that a corresponding tool (Allen key) may be inserted into the plug recess for the purpose of adjusting the position of the device on the Allen bolt head, as may be required when the indicator, which is typically a pointer, is required to be aligned in some manner with another indicium, such as an adjacent similar device (where the pointers are directed in alignment around the circle) or the pointer of an adjacent device (where the pointers of adjacent pairs of devices are aligned with each other). Also, insertion of an Allen key in this way may be useful in assisting removal of the device from its fairly tight fit on the underlying Allen bolt head.

A range of devices in accordance with the invention of different external and internal diameter will be provided for fitment to different sizes of Allen bolt heads.

BRIEF DESCRIPTION OF THE DRAWINGS

The invention will be described further, by way of example, with reference to the accompanying drawings, in which.

DETAILED DESCRIPTION

Figure 1:
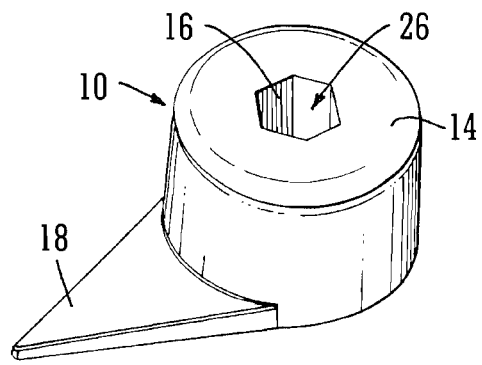
FIGS. 1, 2 and 3 are perspective views of three similar embodiments of the safety device of the invention, these being of different body size and with pointers of different proportion relative to the diameter of the body.
Figure 2:
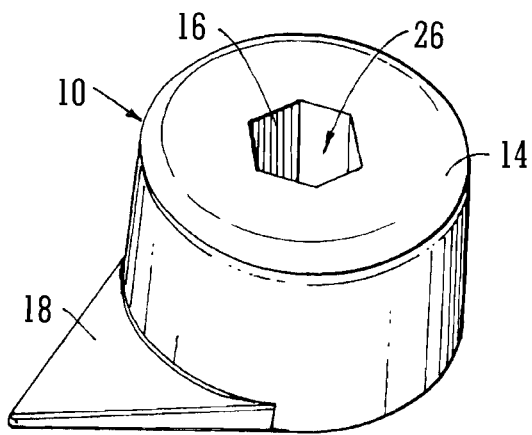
Figure 3:
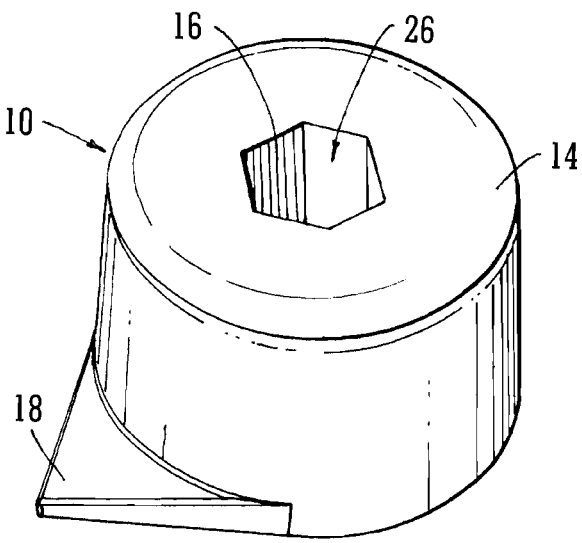
Figure 4:
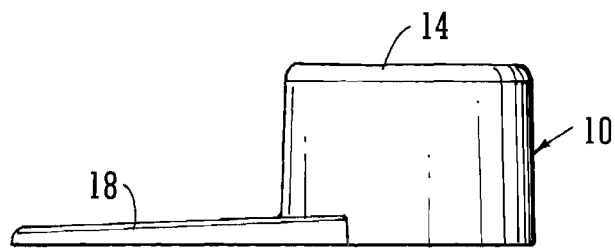
FIGS. 4, 5 and 6 are corresponding side views of the three embodiments shown in the preceding Figures.
Figure 5:
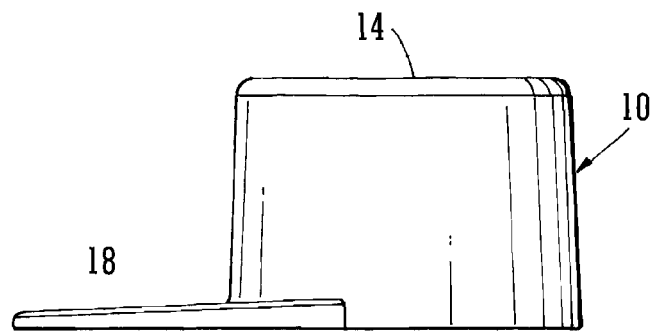
Figure 6:
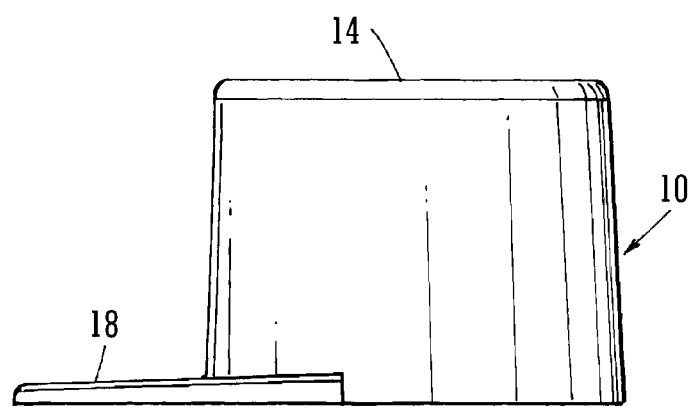
Figure 7:
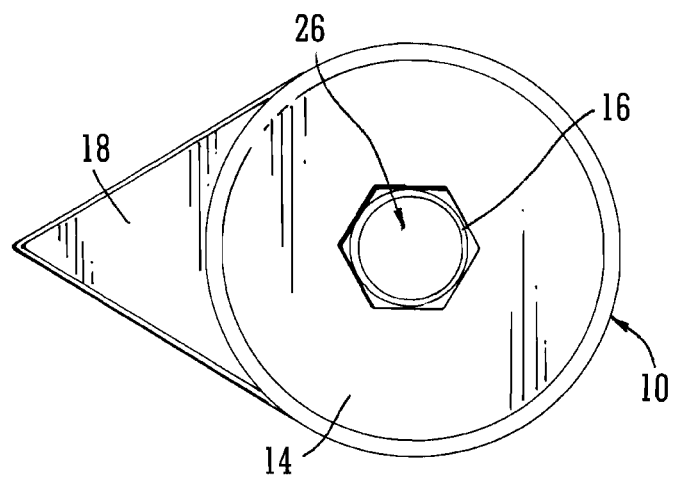
FIG. 7 is a plan view of the embodiment shown in FIGS. 2 and 5.

As illustrated, an exemplary safety device in accordance with the invention comprises a body 10 which is hollow, thus having a bore, this bore being formed with splines 12, namely a series of narrow longitudinal ridges formed by intervening narrow grooves. At one end, the body 10 has an end closure 14 formed with a central plug 16 projecting inwardly of the bore to define an annular surrounding space. Further, the body 10 is provided with a pointer 18 which is integrally formed with the body and projects laterally from an edge of the body at the opposite end to the end closure 14.

Figure 8:
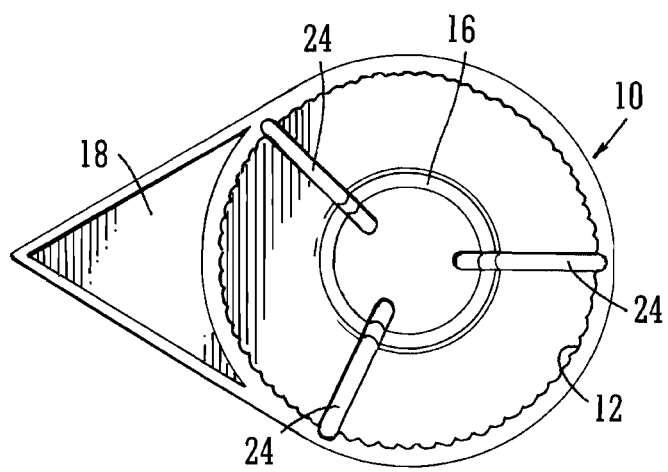
FIG. 8 is an underside view of the same embodiment.
Figure 9:
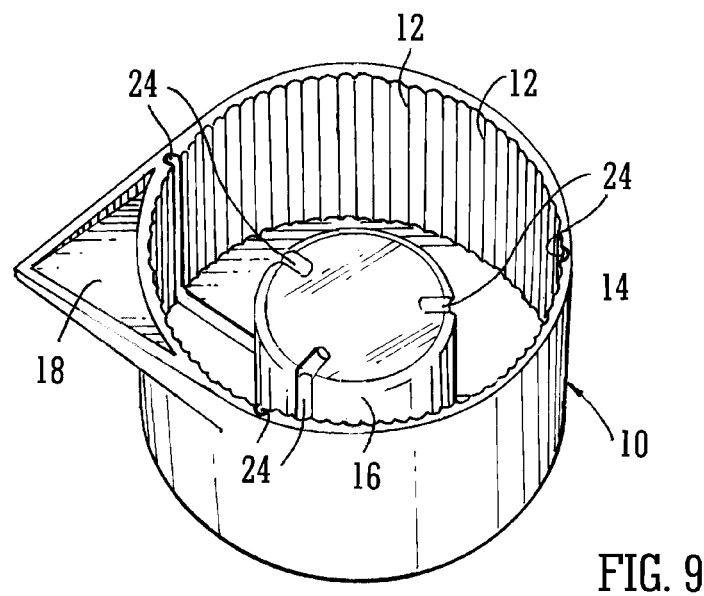
FIG. 9 is a perspective view from below of the embodiment shown in FIGS. 3 and 6.

In the illustrated embodiments, the wall of the body 10, both internally and externally, is substantially cylindrical. The outer surface of the plug 16, within the bore, is also substantially cylindrical. However, the plug 16 is itself formed with a recess 26 extending inwards from the end closure 14. This recess 26 is hexagonal in cross-section, being formed with six adjoining side wall sections. Further, as best shown in FIGS. 8 and 9, three generally equally spaced grooves 24, each distinctly wider than the gaps between the splines 12 are provided in the interior of the device extending from the underside of the base of the plug 16, down the side of the plug 16, radially outwards across the inside of the end closure 14, and up the side of the splined inner surface of the body 10 to an edge of the body opposite the end closure 14. The purpose of these grooves 24 is to enable air to escape during fitting of the device onto the head of an Allen bolt 30 in the manner shown in FIGS. 10 and 11, and thus to make such fitting easier, requiring less force, and also preventing subsequent risk of the device subsequently lifting off the bolt head owing to the pressure of trapped air.

Figure 10:
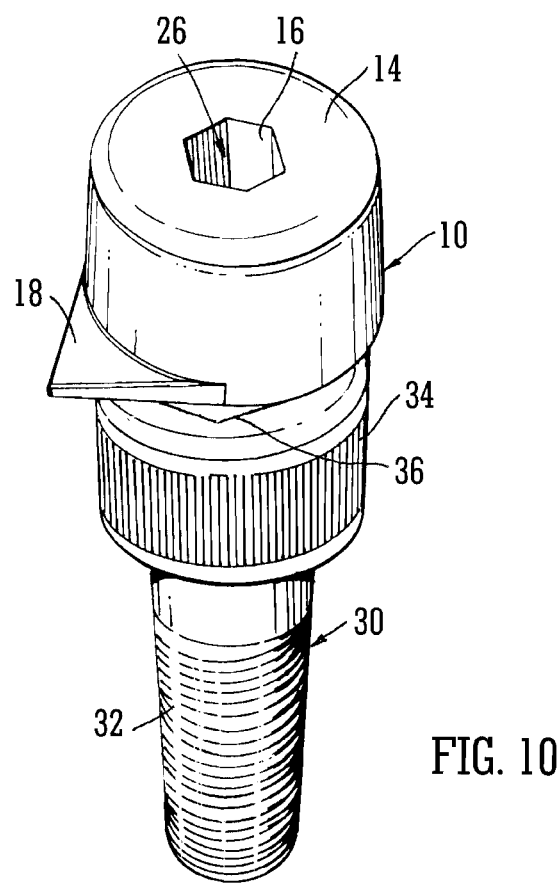
FIG. 10 is a perspective view showing the device of FIGS. 3, 6 and 9 as it is being fitted onto the head of an Allen bolt.
Figure 11:
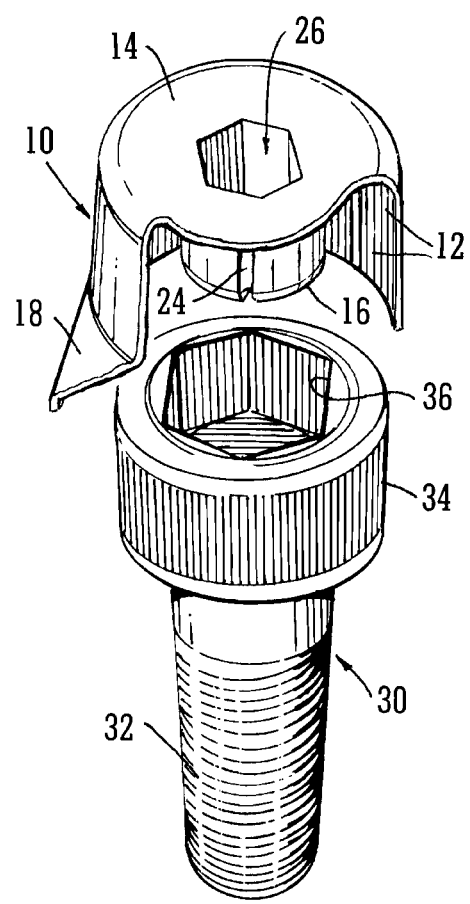
FIG. 11 is a view similar to FIG. 10 with the safety device cutaway partially to reveal its manner of fitment into the recess of the Allen bolt head.

As shown in FIGS. 10 and 11, a known style of Allen bolt 30 has a threaded shank 32 and an enlarged head 34 with a substantially cylindrical perimeter which may be, as shown, splined. A recess or countersunk bore 36 is provided in the centre of the Allen bolt head and is shown in FIG. 10 as being of typical hexagonal cross-section.

In use, the safety device of the invention is located over the head 34 of an Allen bolt 30 after the latter has been used for securing parts together. In this respect, the head 34 will project upwards from the surface into which the shank 32 is threadedly engaged. The size of the device 10 is chosen so that the splined interior wall of the body 10 is a close fit to the outside of the Allen bolt head 34, with a measure of frictional and direct inter-engagement so that the device can be fitted in any chosen rotational orientation relative to the head but once fitted is non-rotatable on the head. Additionally, at the same time, the plug 16 of the device engages as a snug fit into the recess 36 of the Allen bolt head. Thus, there is a measure of frictional engagement between the cylindrical outer surface of the plug 16 and the hexagonal shape of the recess 36. This supplements the engagement around the exterior of the Allen bolt head to ensure non-rotatable fitting of the device on the head 34.

Clearly, it will be necessary to match the dimensions of the device to the sizes of conventional Alan bolt heads and three distinct sizes are shown here in FIGS. 1 and 4, 2 and 5, 3 and 6, respectively. Further, different proportional sizes and shapes of pointers 18 are shown on these different embodiments as the length of the pointer can be chosen to match the spacing between Allen bolts in various situations so that there will always be a narrow gap between pointers of devices mounted on adjacent Allen bolt heads when the pointers 18 are directed towards each other. However, for all these embodiments, the same reference numerals are used for corresponding parts for ease of reference.

A hexagonal Allen bolt key (not shown) will be used for tightening the Allen bolt. After the device has been fitted onto the bolt head 34, a similar Allen bolt key, but of smaller dimensions, can be inserted into the recess 26 in the outside of the plug 16 in order to move the device slightly in its rotational position on the Allen bolt head 34 if this is necessary in order to move the pointer 18 into a predetermined position, for example inexact alignment with the tip of a pointer on a similar device which is mounted upon an adjacent Allen bolt head. Also, insertion of an Allen key in this way may be useful in assisting removal of the device from the underlying Allen bolt head.

Embodiments of the device of the invention may suitably be moulded from an appropriate grade of plastics material, such as polypropylene. Typically, the material is pigmented so as to be a bright, easily visible colour, such as fluorescent yellow. In this respect, the pointer is to serve as a visual indicator as to whether an Allen bolt which has been fastened has worked loose and requires tightening.

The invention is not restricted to the details of the foregoing embodiments. Many variations are possible in other embodiments. In particular, the outer contour of the body may vary and need not be cylindrical. It could, for example, be hexagonal, or square, or any other suitable shape. The outer contour of the plug will preferably be cylindrical, as in the illustrated embodiments as that will fit not only into a hexagonal shaped Allen bolt recess, as in the illustrated embodiment, but also into a square shaped recess which is sometimes provided in alternative styles of Allen bolt. However, it is also feasible that the outer shape of the plug may differ. It is also important to note that in other embodiments the plug may be solid rather than hollow as in the illustrated examples. In embodiments where the plug is hollow, namely with a recess, the shape of the recess in the plug may be different from the illustrated embodiment and, in particular, it may be square instead of hexagonal, or it may be cylindrical, although that would not have the added advantage of ease of rotational adjustment of the device when fitted by a further Allen key. The pointer, as has already been noted, may vary in shape and in proportion relative to the body. In other embodiments it may instead be located at the top of the device, adjacent the end closure, rather than at the rim of the body. In other embodiments, a projecting pointer may be replaced by a formation or marking on the body itself, such as an arrow head. As regards provision for escape of air, any number of internal grooves, wider than the splines, may be provided and in any arrangement. These may extend only from the end closure to the edge of the body. Alternatively, there may be no grooves provided and instead a small opening may be provided in the end closure to enable escape of air upon fitting of the device onto a bolt head.

Throughout the description and claims of this specification, the words "comprise" and "contain" and variations of them mean "including but not limited to", and they are not intended to (and do not) exclude other components. Throughout the description and claims of this specification, the singular encompasses the plural unless the context otherwise requires. In particular, where the indefinite article is used, the specification is to be understood as contemplating plurality as well as singularity, unless the context requires otherwise.

Features described in conjunction with a particular embodiment or example of the invention are to be understood to be applicable to any other embodiment or example described herein unless incompatible therewith.

The invention claimed is:

1. An assembly for indicating rotational displacement between a bolt having a bolt head provided with a central recess for engagement by a fastening/unfastening tool and a substrate to which the bolt is fastened, the assembly comprising:
    a bolt having a bolt head provided with a central recess for engagement by a fastening/unfastening tool; and
    a removable safety device comprising:
        a body having a bore formed with splines, having a first open end in which the bolt head is received, and a second end disposed opposite the first open end, the second end including an end closure formed with a plug in which the central recess of the bolt head is removably engaged; and
        an indicator which is marked, mounted or formed on said body,
        wherein the plug projects from the end closure towards the first open end in the bore, wherein an end of the plug disposed towards the first open end is closed, and
        wherein the plug has a cylindrical outer surface that is in frictional engagement with the central recess of the bolt head.

2. The assembly according to claim 1, wherein the body has a wall of substantially cylindrical configuration.

3. The assembly according to claim 1, wherein at least one groove is provided in the splined inner surface of the bore and extends from the end closure to an edge of the body opposite to the end closure to enable escape of air during fitting of the device onto the bolt head.

4. The assembly according to claim 1, wherein the plug is formed with a recess extending inwards from the end closure of the body.

5. The assembly according to claim 1, wherein the indicator is a pointer which is integrally formed with the body.

6. The assembly according to claim 5, wherein the pointer extends laterally outwards from a section of the wall of the body.

7. The assembly according to claim 6, wherein the pointer extends outwards from the body at a location remote from the end closure.

8. The assembly according to claim 6, wherein the pointer extends from an edge of the body at an end of the body opposite to the end closure.

9. The assembly according to claim 1, wherein the end closure includes a recess extending into the plug.

10. A safety device for indicating rotational displacement between a bolt having a bolt head provided with a central recess for engagement by a fastening/unfastening tool and a substrate to which the bolt is fastened, the device comprising a body having a bore formed with splines, having an end closure formed with a plug projecting inwardly of the bore for snug engagement into the central recess of the bolt head, and having an indicator which is marked, mounted or formed on said body, wherein a recess in the plug is configured with a polygonal cross-section.

11. The safety device according to claim 10 wherein the recess in the plug is configured with a hexagonal cross-section.

12. The safety device according to claim 10, wherein the recess extends inwards from the end closure of the body.

13. A removable safety device for indicating rotational displacement between a bolt having a bolt head provided with a central recess for engagement by a fastening/unfastening tool and a substrate to which the bolt is fastened, the device comprising:
    a body having a bore formed with splines, a first open end for receiving the bolt head, and a second end disposed opposite to the first open end, the second end including an end closure formed with a plug for snug removable engagement into the central recess of the bolt head; and
    an indicator which is marked, mounted or formed on said body,
    wherein the plug projects from the end closure towards the first open end in the bore,
    an end of the plug disposed towards the first open end is closed, and
    the plug is formed with a recess extending inwards from the end closure of the body.

* * * * *